(12) United States Patent
Szapiel et al.

(10) Patent No.: US 11,982,806 B2
(45) Date of Patent: May 14, 2024

(54) OPTICAL SYSTEM WITH ADJUSTABLE EYE RELIEF

(71) Applicant: RAYTHEON CANADA LIMITED, Ottawa (CA)

(72) Inventors: Stan Szapiel, Midland (CA); Stefan Atalick, Midland (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 194 days.

(21) Appl. No.: 17/848,585

(22) Filed: Jun. 24, 2022

(65) Prior Publication Data
US 2023/0004000 A1    Jan. 5, 2023

Related U.S. Application Data

(60) Provisional application No. 63/217,413, filed on Jul. 1, 2021.

(51) Int. Cl.
| | | |
|---|---|---|
| G02B 27/00 | (2006.01) | |
| G02B 13/00 | (2006.01) | |
| G02B 25/00 | (2006.01) | |
| G02B 27/30 | (2006.01) | |

(52) U.S. Cl.
CPC ..... G02B 27/0081 (2013.01); G02B 13/0095 (2013.01); G02B 25/001 (2013.01); G02B 27/30 (2013.01)

(58) Field of Classification Search
CPC ............ G02B 27/0081; G02B 13/0095; G02B 25/001; G02B 27/30
See application file for complete search history.

(56) References Cited

U.S. PATENT DOCUMENTS

| | | | |
|---|---|---|---|
| 3,172,941 A | 3/1965 | Norman | |
| 8,928,975 B2 | 1/2015 | Milman | |
| 9,494,787 B1* | 11/2016 | Bagwell | .................. G02B 3/14 |
| 2012/0192478 A1* | 8/2012 | Jahromi | .................. F41G 1/38 |
| | | | 42/122 |

FOREIGN PATENT DOCUMENTS

TW        201903464 A     1/2019

OTHER PUBLICATIONS

International Search Report and Written Opinion in Application No. PCT/CA2022/051046 dated Oct. 4, 2022 (7 pgs.).

* cited by examiner

*Primary Examiner* — James C. Jones
(74) *Attorney, Agent, or Firm* — NORTON ROSE FULBRIGHT CANADA LLP

(57) ABSTRACT

An optical system with adjustable eye relief includes a relay lens assembly. The relay lens assembly is defined by a collimating lens and a focusing lens. The optical system includes an aperture stop. The aperture stop is configured to shift axially along an optical axis between the collimating lens and the focusing lens. The optical system also includes an afocal lens assembly. The afocal lens assembly is defined by the focusing lens and an eyepiece. Additionally, an axial shift of the aperture stop along the optical axis between the collimating lens and the focusing lens changes an eye relief of the eyepiece based on a transverse magnification of the afocal lens assembly.

20 Claims, 5 Drawing Sheets

OPTICAL SYSTEM WITH ADJUSTABLE EYE RELIEF

CROSS-REFERENCE TO RELATED APPLICATIONS

The present application claims the benefit of provisional application No. 63/217,413, filed Jul. 1, 2021, the entire contents of which is incorporated herein by reference.

TECHNICAL FIELD

The subject disclosure relates to viewing optics, and more particularly to optical systems with eye relief.

BACKGROUND

When using a visual optical system, such as a telescopic sight in a firearm, a spotting telescope, a microscope, medical imaging device, or the like, an eyepiece lens forms an exit pupil which is the real image of the aperture stop of the optical system. In order to view a target, a user must approximately align their eye pupil to the plane of the exit pupil along the primary optical axis of the optical system in order to avoid severe vignetting or total loss of the observed target.

Eye relief is defined as the distance along the primary optical axis measured from the vertex of last optical surface (the surface that is directly observed by the user) of the optical system to the plane of exit pupil. Typical optical systems have fixed eye relief, such that the distance between the plane of the exit pupil and the last optical surface of the optical system cannot be changed. This makes it difficult to deploy the same optical system for different types of applications, such as several different firearms, telescopes, microscopes, or medical imaging devices. For example, firearms requiring different chickweld positions, different ammunition calibers, and having different recoil effects each call for different eye reliefs.

SUMMARY OF THE TECHNOLOGY

In at least one aspect, the application describes an optical system with adjustable eye relief with significant working range. The optical system employs an aperture stop configured to shift axially along an optical axis between a set of lenses. The axial shift of the aperture stop causes an axial shift of the exit pupil while the exit pupil size remains the same, independent of the distance in axial shift of the aperture stop.

This is completed by using an afocal group inside of the optical system to produce a real image of the aperture stop. Afocal imagery of the pupil keeps the pupil size the same at all possible values of the eye relief. The absolute value of transverse magnification of the afocal group may be greater than 1, so even a small axial shift of the aperture stop can dramatically change eye relief. Optical systems as described herein provide no decolimation of the image when the eye relief is adjusted, no changes in exit pupil diameter, no excessive vignetting to be perceived by a user, and minimal time of adjustment.

According to one aspect, an optical system with adjustable eye relief is provided. The optical system includes a relay lens assembly. The relay lens assembly is defined by a collimating lens and a focusing lens. The optical system includes an aperture stop. The aperture stop is configured to shift axially along an optical axis between the collimating lens and the focusing lens. The optical system also includes an afocal lens assembly. The afocal lens assembly is defined by the focusing lens and an eyepiece. Additionally, an axial shift of the aperture stop along the optical axis between the collimating lens and the focusing lens changes an eye relief of the eyepiece based on a transverse magnification of the afocal lens assembly.

In some exemplary embodiments of the optical system, the axial gain factor of the optical system is equal to the square of a transverse magnification of the afocal lens assembly. In some exemplary embodiments of the optical system, the axial shift of the aperture stop along the optical axis is rationally related to the axial gain factor such that the axial gain factor defines a multiple to which the eye relief increases or decreases based on the axial shift of the aperture stop.

In some exemplary embodiments, the optical system includes a reticle disposed at a first focal plane of the optical system, the first focal plane disposed between a target and the relay lens assembly.

In some exemplary embodiments, the optical system includes a reticle disposed at a second focal plane of the optical system, the second focal plane disposed between the focusing lens and the eyepiece.

In some exemplary embodiments, the collimating lens of the optical system creates an infinite image of a first focal plane.

In some exemplary embodiments of the optical system, the axial shift of the aperture stop along the optical axis away from the collimating lens lengthens the eye relief of the eyepiece.

In some exemplary embodiments, the optical system includes an axial shift of the aperture stop along the optical axis toward the collimating lens shortens the eye relief of the eyepiece.

In some exemplary embodiments, the optical system is adapted to function within one or more of the following apparatuses: a telescope, microscope, or medical imaging device.

According to another aspect, a method for adjusting eye relief in an optical system is provided. The method includes creating an infinite image of a first focal plane with a collimating lens, the collimating lens having a finite focal length. The method also includes receiving, with an aperture stop, the infinite image of the first focal plane to produce an image of the aperture stop. The method includes converging, with a focusing lens, the image of the aperture stop to an exit pupil. The method includes receiving, with an eyepiece, an image of a second focal plane. The method further includes projecting, with the eyepiece, the image of the second focal plane to infinity, wherein axially shifting the aperture stop along an optical axis between the collimating lens and the focusing lens changes a distance between the eyepiece and the exit pupil.

In some exemplary embodiments of the method, an axial gain factor of the optical system is equal to the square of a transverse magnification defined by the collimating lens and the focusing lens. In some exemplary embodiments of the method, axially shifting the aperture stop along the optical axis is rationally related to an axial gain factor such that the axial gain factor defines a multiple to which the eye relief increases or decreases based on axially shifting the aperture stop.

In some exemplary embodiments, the method includes imposing a reticle at the first focal plane of the optical system.

In some exemplary embodiments, the method includes imposing a reticle at the second focal plane of the optical system.

In some exemplary embodiments, the method includes projecting, with the eyepiece, the image of the second focal plane to infinity projecting light towards an exit pupil.

In some exemplary embodiments of the method, axially shifting the aperture along the optical axis toward the collimating lens shortens the distance between the eyepiece and the exit pupil.

In some exemplary embodiments of the method, axially shifting the aperture along the optical axis away from collimating lens lengthens the distance between the eyepiece and the exit pupil.

In some exemplary embodiments of the method, axially shifting the aperture along the optical axis includes manual or automatic axial shifting.

In some exemplary embodiments of the method, the optical system is adapted to function within one or more of the following apparatuses: a telescope, microscope, or medical imaging device.

According to a further aspect, a terrestrial eyepiece with adjustable eye relief is provided. The terrestrial eyepiece includes a collimating lens configured to create an image of a first focal plane an infinite distance away. The terrestrial eyepiece also includes a focusing lens configured to project the image of the first focal plane from infinity to a second focal plane. The terrestrial eyepiece includes an eyepiece configured to receive an image of the second focal plane and project the image of the second focal plane to infinity. The terrestrial eyepiece further includes an aperture stop configured to shift axially between the collimating lens and the focusing lens such that an axial shift toward the focusing lens increases a distance between the eyepiece and the exit pupil, and an axial shift toward the collimating lens decreases the distance between the eyepiece and the exit pupil. The terrestrial eyepiece further includes a monocular housing defined by the collimating lens and the eyepiece.

DETAILED DESCRIPTION

The subject technology addresses deficiencies and shortcomings associated with eye relief in an optical system. Particularly, the subject technology provides an apparatus and methods of using the same to adjust the distance from an outer surface of an eyepiece lens in an optical system to the position where an exit pupil is formed. In this regard, the same optical system may be deployed for different applications. For example, optical systems as described herein may be used in combination with several different types of guns and rifles requiring varied chickweld positioning, ammunition calibers, and having varied recoil effects.

Figure 1A:
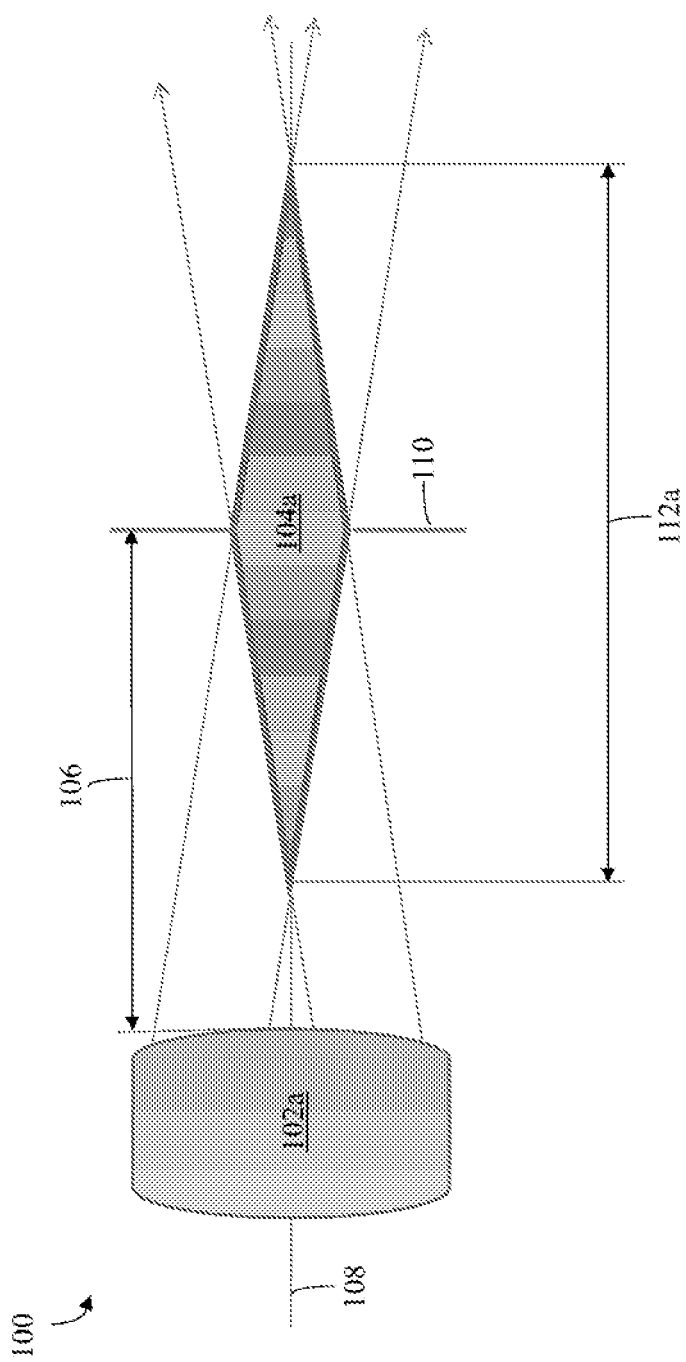
FIG. 1A is an example eyepiece and a corresponding eyebox of optical systems described herein.
Figure 1B:
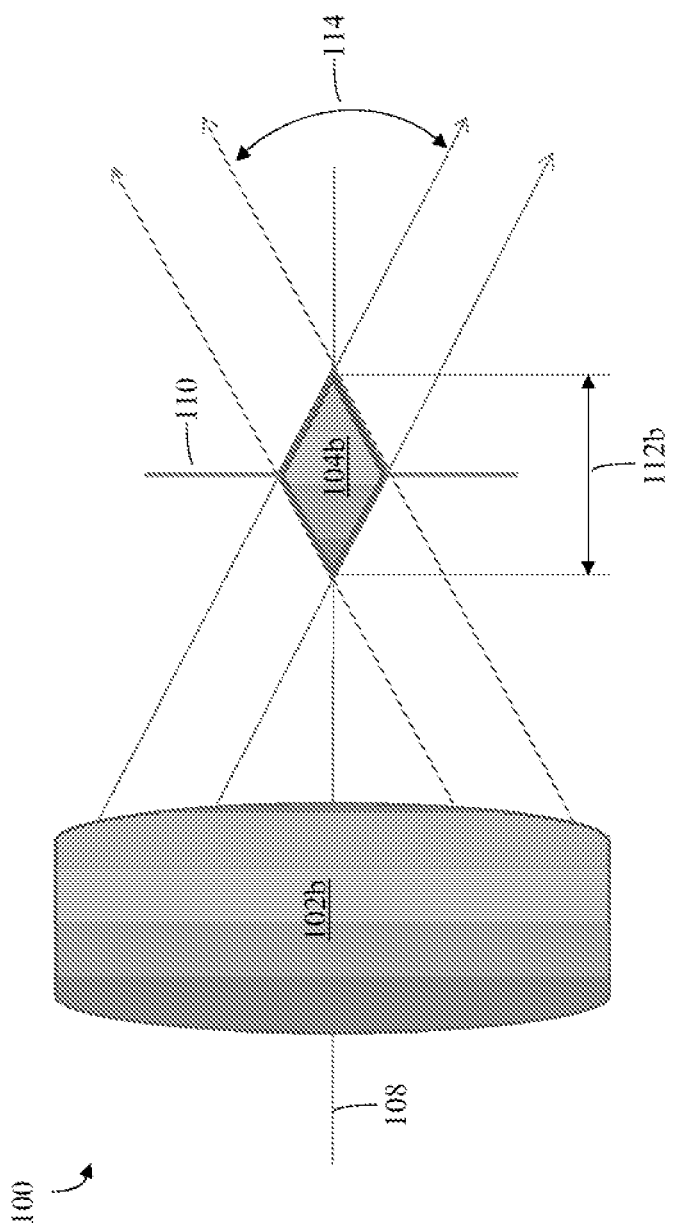
FIG. 1B is a second example eyepiece and a corresponding eyebox of optical systems described herein.

FIGS. 1A and 1B show an eyepiece 102a, 102b of an optical system 100. The optical system 100 may be used in an optical system, such as a telescopic sight in a firearm, telescope, a microscope, medical imaging device, or the like. In each case, the eyepiece 102a, 102b produces a corresponding eyebox 104a, 104b. The eyebox 104a, 104b defines a volume position behind an optical system relative to a target. The volume position includes at least lateral and axial dimensions relative an optical axis. When a user aligns their eye within the eyebox 104a, 104b, they may see a full field of view of a target on each magnification setting of the optical system 100.

As illustrated in FIGS. 1A and 1B, each eyebox 104a, 104b includes a corresponding eyebox depth 112a, 112b along the optical axis 108. For telescopes with a large apparent field of view (shown as angle 114 in FIG. 1B), the eyebox depth 112a, 112b can be small, particularly when the magnification is large. Thus, as shown relatively in FIGS. 1A and 1B, for an optical system 100 having a smaller apparent field of view, the eyepiece 102a may produce an eyebox 104a having a longer eyebox depth 112a than an optical system 100 having a relatively larger apparent field of view in which the eyepiece 102b may produce an eyebox 104b having a shorter eyebox depth 112b.

The eye relief 106 may be defined as the distance along the primary optical axis 108 measured from the vertex of last optical surface of the eyepiece 102a, 102b to the plane of exit pupil 110 of the optical system 100, where the exit pupil 110 is a real image of the aperture stop (not shown) of the optical system 100 projected into eye space. The eye relief 106 may also be defined as the distance along the primary optical axis 108 measured from the vertex of last optical surface of the eyepiece 102a, 102b to an origin of the eyebox 104a, 104b. The eye relief 106 may include the distance that a user's eye needs to be positioned from the eyepiece 102a, 102b to have a clear view of a target and to avoid severe vignetting or total loss of the observed target. The longer the eyebox depth 112a, 112b is, the more forgiving the eye relief 106. This amount of forgiveness may include the distance a user can move closer and further from the optical system 100, while on a given magnification setting, and still keep a clear field of view, such that the user's eye is within the depth 112a, 112b of the eyebox 104a, 104b.

The terminology used herein refers to those dimensions (transverse or perpendicular to the optical axis 108) as X and Y, and to the axial dimension, along the optical axis 108, as Z; however, this terminology is not intended to limit to the systems discussed herein to any particular spatial positioning.

Figure 2:
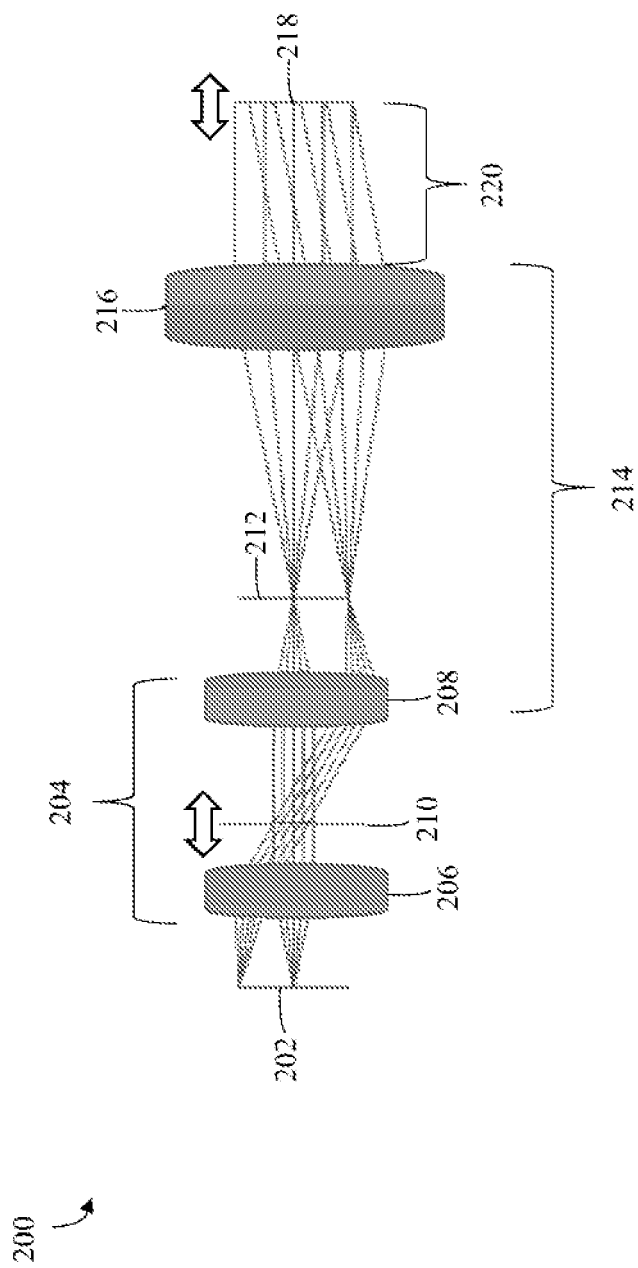
FIG. 2 is an implementation of an optical system including a relay lens assembly, an afocal lens assembly, and an aperture stop within a terrestrial eyepiece.

Referring now to FIG. 2, an optical system 200 is shown. The optical system 200 may be used in several different applications, including to observe light from a target and either enhance an image of the target for viewing, or to analyze and determine target characteristics and properties. The optical system 200 may be used in an optical system with adjustable eye relief. As such, the optical system may be adapted to function within one or more of the following apparatuses: a telescope, microscope, or medical imaging device.

The optical system 200 may receive light from a first focal plane 202. The first focal plane 202 may include a plane, perpendicular to the optical axis 108 of optical system 200. The first focal plane 202 may include light reflected from or emitted by a target. In the same respect, the first focal plane 202 may include an image of the target. One or more lenses or lens systems may be included upstream of the first focal plane 202. For example, one or more lenses or lens systems may be disposed along the optical axis 108 in between a target and the first focal plane 202. The one or more lenses or lens systems may be positioned along the optical axis 108 to receive, converge, project, or otherwise relay light from the target to the first focal plane 202, and consequently optical system 200. The optical system 200 described herein may include a reticle disposed at the position of the first focal plane 202 or the second focal plane 212, or both.

Optical system 200 may include a relay lens assembly 204 defined by a collimating lens 206 and a focusing lens 208. The relay lens assembly 204 may relay an image of the first focal plane 202. The relay lens assembly 204 may be disposed in an upstream portion of the optical system 200 such that it receives light prior to other optical components within the optical system 200.

The relay lens assembly 204 may optically transform light emanating from the first focal plane 202 and may extend the length of optical system 200. The relay lens assembly 204 may increase or decrease a footprint of light emanating from the first focal plane 202.

The relay lens assembly 204 may be configured to produce intermediate focal planes, such as for example, a second focal plane 212. The relay lens assembly 204 may invert the image of the first focal plane 202. In other implementations, the image of the first focal plane 202 may already be inverted, and thus relay lens assembly 204 may invert the image of the first focal plane 202 into an erect image so a user sees an upright target.

The collimating lens 206 may be disposed at a first portion of the relay lens assembly 204, such that it receives light first of all optical components within optical system 200. The collimating lens 206 may be disposed along optical axis 108. The collimating lens 206 may include a curved mirror or lens. For example, the collimating lens 206 may include a convex or concave lens. Alternatively, the collimating lens 206 may include a flat mirror or lens. Though, it should be understood that any lens or mirror may be suitable for implementations described herein. The collimating lens 206 may align light from the first focal plane 202 in a specific direction, such as downstream optical axis 108 away from a target and toward a user. The first focal plane 202 or light emanating therefrom may be aligned at one or more foci of the collimating lens 206. The collimating lens 206 may create an image of the first focal plane 202 at infinity. In this regard, light emitted from the collimating lens 206 may include no divergence or convergence. Thus, as the distance light travels from the collimating lens 206 increases, spherical wavefronts of the light may become flatter and closer to plane waves, which may be perfectly collimated. Diverging light from a direction of the first focal plane 202 may be received by the collimating lens 206. The collimating lens 206 may thereafter emit parallel light in return. Because parallel light does not converge, the collimating lens 206 creates an infinite image of the first focal plane 202. According to the present disclosure, infinite image can be used to articulate that an image is located at infinity. The focal length of the collimating lens 206 may vary based on a required collimation, convergence, or divergence. The collimating lens 206 may have a finite focal length.

In other implementations, light emitted from the collimating lens 206 may diverge or converge as it propagates. Where the collimating lens 206 includes a converging lens, the focal length of collimating lens 206 is positive and is defined by the distance at which a beam of collimated light from the first focal plane 202 will be focused to a single spot. Where the collimating lens 206 includes a diverging lens the focal length of collimating lens 206 is negative and is defined by the distance to the point from which a collimated beam appears to be diverging after passing through the collimating lens 206.

Aperture stop 210 may be disposed between the collimating lens 206 and a focusing lens 208. The aperture stop 210 may be disposed along optical axis 108. The aperture stop 210 may include an opening through which light passes. Aperture stop 210 may be configured to receive light from the collimating lens 206. In this regard, aperture stop 210 may pass the infinite image of the first focal plane 202 produced by collimating lens 206. The image may include rays that are not blocked by aperture stop 210, including light that passes through the opening of the aperture stop 210.

The aperture stop 210 may be positioned along a rail, track, actuating device, or a similar movement system such that the aperture stop 210 can shift axially, along the optical axis, either automatically or with user input. In this regard, the aperture stop 210 may be positioned in different locations between the collimating lens 206 and the focusing lens 208 through axial shifting maneuvers enabled by the rail, track, actuating device, or a similar movement system.

The focusing lens 208 may be disposed at an end portion of the relay lens assembly 204, such that it receives light after the collimating lens 206 and the aperture stop 210 within optical system 200. The focusing lens 208 may be disposed along optical axis 108. The focusing lens 208 may include a curved mirror or lens. For example, the focusing lens 206 may include a convex or concave lens. Alternatively, the focusing lens 208 may include a flat mirror or lens. Though, it should be understood that any lens or mirror may be suitable for implementations described herein. The focusing lens may align light from the aperture stop 210 in a specific direction, such as downstream optical axis 108 away from a target and toward a user. Light traveling through emanating through the aperture stop 210 may be aligned at one or more foci of the focusing lens 208.

The focusing lens 208 may converge the image of the aperture stop toward an exit pupil 218 and produce the image by way of an eyepiece 216. It should be noted that focusing lens 208 can perform two imaging operations. Focusing lens 208 can take the collimated input produced by collimating lens 206 and focus it at second focal plane 212. Focusing lens 208 can also pick up aperture stop 210 as a finite object, and create its image at a location other than second focal plane 212. This intermediate image can then be reimaged by the eyepiece 216 into exit pupil 218. In this way, second focal plane 212 may be the real image of first focal plane 202, and exit pupil 218 the real image of aperture stop 210. Light emitted from the focusing lens 208 may converge as it propagates. The focusing lens 208 may include a converging lens such that the focal length of focusing lens 208 is positive and is defined by the distance at which a beam of collimated light from the aperture stop 210 will be focused to a single spot.

In other implementations, the focusing lens 208 may diverge the image of the aperture stop as it propagates. In this regard, light emitted from the focusing lens 208 may diverge as it propagates. The focusing lens 208 may include a diverging lens such that the focal length of focusing lens 208 is negative and is defined by the distance to the point from which a collimated beam appears to be diverging after passing through the focusing lens 208.

Optical system 200 may include an afocal lens assembly 214 defined by the focusing lens 208 and the eyepiece 216.

The afocal lens assembly 214 may relay an image of the aperture stop 210 or light propagating therethrough. The afocal lens assembly 214 may be disposed downstream of the first focal plane 202, relay lens assembly 204, and/or the aperture stop 210. The afocal lens assembly 214 may optically transform light emanating from the aperture stop 210 and may extend the length of optical system 200.

The afocal lens assembly 214 may maintain a cross-section of light emanating from the first focal plane 202. For example, the afocal lens assembly 214 may allow a beam of light from the aperture stop 210 to propagate therethrough to a user where the beam of light undergoes zero net convergence or divergence. In this regard, the afocal lens assembly 214 may include an infinite effective focal length. As such the distance between the focusing lens 208 and the eyepiece 216 may equal the sum of focal lengths of the focusing lens 208 and the eyepiece 216.

Although the afocal lens assembly 214 may not alter the divergence or convergence of the beam of light exiting the aperture stop 210, afocal lens assembly 214 may alter a transverse footprint of the beam of light, increasing magnification. As such, afocal lens assembly 214 may provide transverse magnification to the beam of light exiting the aperture stop 210. Transverse magnification may refer to magnification measured in planes perpendicular or transverse to the optical axis 108. For example, the height of the footprint of the beam of light exiting the aperture stop 210 may be increased by afocal lens assembly 214 through a transverse magnification factor. A negative transverse magnification denotes an inverted image. Transverse magnification as described herein is different than longitudinal magnification which defines a factor by which an image increases in size, as measured along the optical axis. The transverse magnification of the afocal lens assembly 214 may remain as a constant value.

The optical system 200 may include an axial gain factor. The axial gain factor refers to a factor by which an exit pupil 218 shifts axially relative the components within optical system 200. The axial gain factor may determine a distance 220 between the outer surface of the last lens of the eyepiece 216 to a position where the exit pupil 218 is formed. The exit pupil may include a transverse plane along the optical axis 108. A user's eye positioned at the exit pupil 218 allows the user to obtain a full viewing angle of the beam of light exiting the aperture stop 210. If the user's eye is outside of the exit pupil 218, a reduced field of view of the beam of light exiting the aperture stop 210 will be obtained.

Where the traverse magnification of the afocal lens assembly 214 is M, an axial gain factor of the optical system 200 is represented by the following equation:

$$\text{Axial Gain Factor} = M^2 \qquad (1)$$

Where the absolute value of M is greater than 1, unexpectedly large axial shifts of an exit focal plane can 218 be observed. The axial gain factor of the optical system 200 is equal to the square of the transverse magnification of the afocal lens assembly 214. In this regard, the axial shift of the aperture stop 212 along the optical axis 108 is rationally related to the axial gain factor such that the axial gain factor defines a multiple to which the eye relief 220 increases based on the axial shift of the aperture stop 212.

Figure 3:
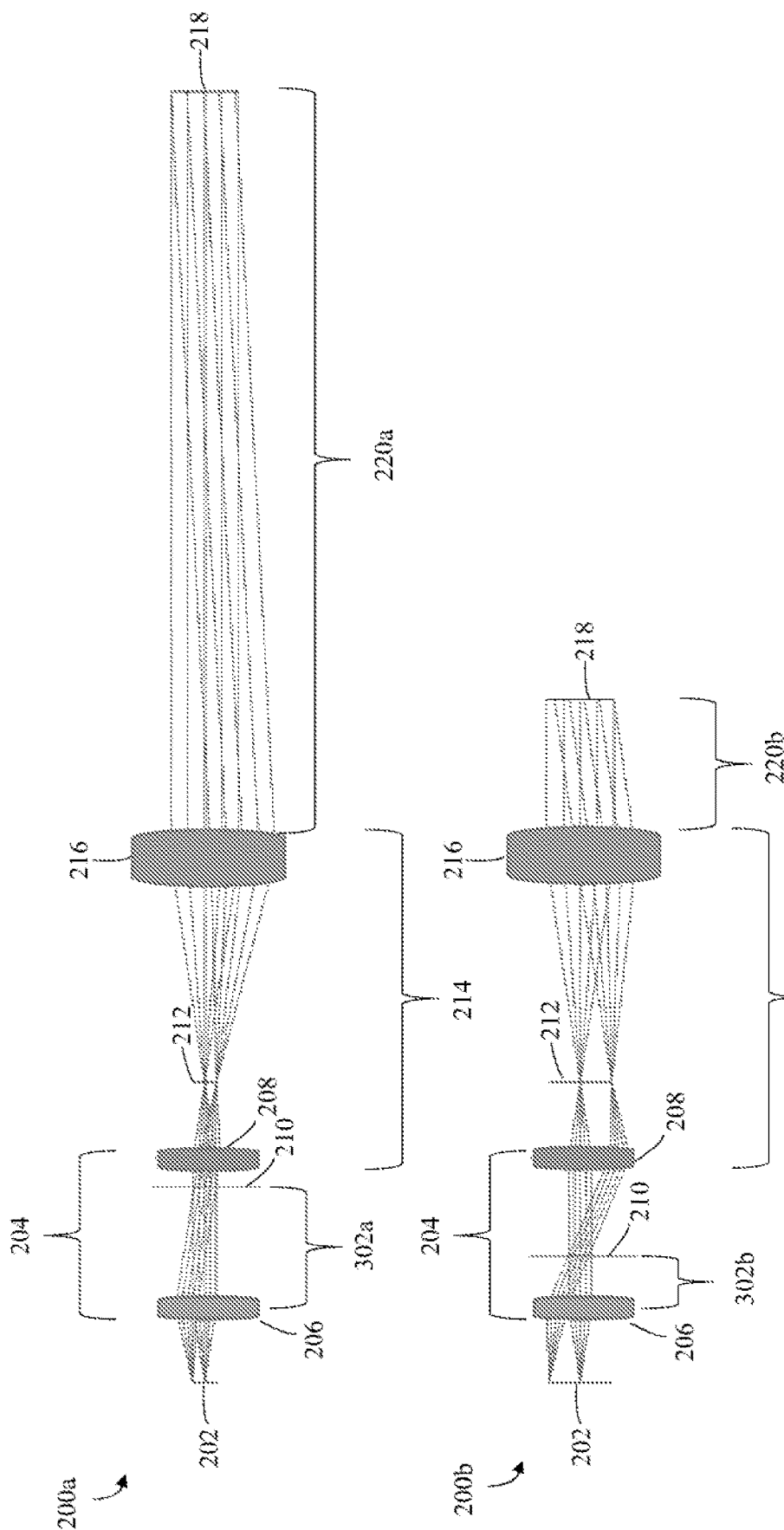
FIG. 3 shows an aperture stop in two different positions as embodied within the optical system of FIG. 2.

Referring now to FIG. 3, a first-order design implementation of an optical system 200 with adjustable eye relief is shown. FIG. 3 displays optical system 200 in two different configurations, the two different configurations differing based on a position of the aperture stop 210. As mentioned prior, the aperture stop 210 may be positioned along a rail, track, actuating device, or a similar movement system such that the aperture stop 210 can shift axially, along the optical axis, either automatically or through user input. In this regard, the aperture stop 210 may be positioned in different locations between the collimating lens 206 and the focusing lens 208 through axial shifting maneuvers enabled by the rail, track, actuating device, or a similar movement system.

In a first configuration 200a, the aperture stop 210 is located an axial distance 302a away from the collimating lens 206 of the relay lens assembly 204, though it should be understood that the distance between the collimating lens 206 and the aperture stop 210 is only referred to in for reference purposes. In other implementations the aperture stop 210 may be located an axial distance away from the focusing lens 208, the eyepiece 216, of the relay lens assembly 204, the first focal plane 202, the second focal plane 212, or the exit pupil 218.

In a second configuration 200b, the aperture stop 210 is located an axial distance 302b away from the collimating lens 206 of the relay lens assembly 204, where axial distance 302a and 302b differ. In this regard, the aperture stop 210 may be actuated along a rail, track, actuating device, or a similar movement system to any position between the collimating lens 206 and the focusing lens 208, for example at positions axial distance 302a and 302b away from the collimating lens 206.

As the axial distance 302 increases, an eye relief 220 increases. For example, where the axial distance in optical system 200a is defined as axial distance 302a, the eye relief is defined as distance 220a. For example, where the axial distance in optical system 200b is defined as axial distance 302b, the eye relief is defined as distance 220b. In this regard, where aperture stop 210 is a greater distance away from collimating lens 206, as shown in optical system 200a, the eye relief includes a greater distance 220a; and where aperture stop 210 is a shorter distance away from collimating lens 206, as shown in optical system 200b, the eye relief includes a shorter distance 220b. Thus, an operator using the optical system 200 embodied within a telescopic sight in a firearm, telescope, a microscope, medical imaging device, or the like may adjust an eye relief for the apparatus by manual or automatic actuation of the aperture stop 210 relative a rail, track, actuating device, or a similar movement system between collimating lens 206 and focusing lens 208.

In optical system 200a and 200b, the transverse magnification of the afocal lens assembly 214, M, is −3. Based on Eq. (1), the axial gain factor of both optical systems 200a and 200b is 9. Thus, the exit pupil 218 moves 9 millimeters for every 1 mm shift of the aperture stop 210.

For example, where the axial distance 302a is 2 millimeters and the axial distance 302b is 1 millimeter, the difference in eye relief distance 220a and 220b is 9 millimeters where each optical system 200a, 200b includes the same transverse magnification of the afocal lens assembly 214, M, of −3.

Figure 4:
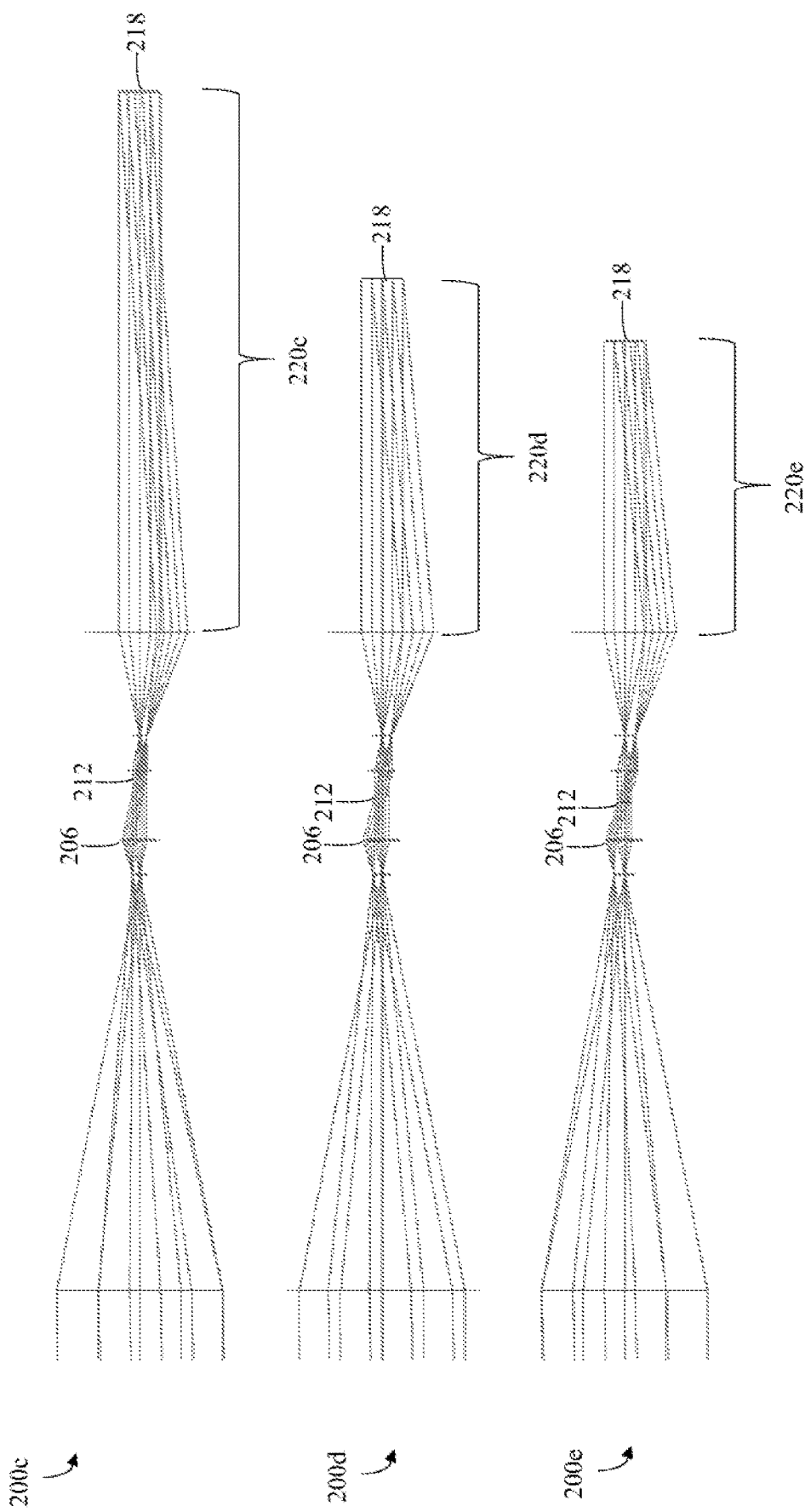
FIG. 4 shows an aperture stop in three different positions as embodied within the optical system of FIG. 2 within an entire telescope, including both an objective and a terrestrial eyepiece.

Referring now to FIG. 4, a first-order design implementation of optical system 200 with adjustable eye relief is shown. As with FIG. 3, FIG. 4 displays optical system 200 in three different configurations, the three different configurations differing based on a position of the aperture stop 210. Optical system 200c includes the largest axial distance 302 between the collimating lens 206 and aperture stop 212 relative optical system 200d and 200e. As such, optical system 200c includes the largest eye relief distance 220c relative optical system 200d and 200e. As the aperture stop 212 is axially shifted along a rail, track, actuating device or a similar movement system closer and closer towards collimating lens 206, the eye relief distance 220 shortens, as shown through the progression of optical system 200c to 200d to 200e.

Elements, equations, or steps of different implementations described may be combined to form other implementations not specifically set forth previously. Elements, equations, or steps may be left out of the lasers or processes described previously without adversely affecting their operation or the operation of the laser in general. Furthermore, various separate elements, equations, or steps may be combined into one or more individual elements or steps to perform the functions described in this specification. It should be understood by one skilled in the art that equations set forth herein may be otherwise expressed in a different form or manner with different underlying assumptions, thus not specifically set forth.

Other implementations not specifically described in this specification are also within the scope of the following claims.

What is claimed is:

1. An optical system with adjustable eye relief comprising:
    a relay lens assembly defined by a collimating lens and a focusing lens;
    an aperture stop configured to shift axially along an optical axis between the collimating lens and the focusing lens; and
    an afocal lens assembly defined by the focusing lens and an eyepiece,
    wherein an axial shift of the aperture stop along the optical axis between the collimating lens and the focusing lens changes an eye relief of the eyepiece based on a transverse magnification of the afocal lens assembly.

2. The optical system of claim 1, wherein an axial gain factor of the optical system is equal to the square of a transverse magnification of the afocal lens assembly.

3. The optical system of claim 2, wherein the axial shift of the aperture stop along the optical axis is rationally related to the axial gain factor such that the axial gain factor defines a multiple to which the eye relief increases or decreases based on the axial shift of the aperture stop.

4. The optical system of claim 1, further comprising a reticle disposed at a first focal plane of the optical system, the first focal plane disposed between a target and the relay lens assembly.

5. The optical system of claim 1, further comprising a reticle disposed at a second focal plane of the optical system, the second focal plane disposed between the focusing lens and the eyepiece.

6. The optical system of claim 1, wherein the collimating lens creates an infinite image of a first focal plane.

7. The optical system of claim 1, wherein an axial shift of the aperture stop along the optical axis away from the collimating lens lengthens the eye relief of the eyepiece.

8. The optical system of claim 1, wherein an axial shift of the aperture stop along the optical axis toward the collimating lens shortens the eye relief of the eyepiece.

9. The optical system of claim 1, wherein the optical system is adapted to function within one or more of the following apparatuses: a telescope, microscope, or medical imaging device.

10. A method for adjusting eye relief in an optical system comprising:
    creating an infinite image of a first focal plane with a collimating lens, the collimating lens having a finite focal length;
    receiving, with an aperture stop, the infinite image of the first focal plane to produce an image of the aperture stop;
    converging, with a focusing lens, the image of the aperture stop to an exit pupil;
    receiving, with an eyepiece, an image of the second focal plane; and
    projecting, with the eyepiece, the image of the second focal plane to infinity;
    wherein axially shifting the aperture stop along an optical axis between the collimating lens and the focusing lens changes a distance between the eyepiece and the exit pupil.

11. The method of claim 10, wherein an axial gain factor of the optical system is equal to the square of a transverse magnification defined by the collimating lens and the focusing lens.

12. The method of claim 11, wherein axially shifting the aperture stop along the optical axis is rationally related to an axial gain factor such that the axial gain factor defines a multiple to which the eye relief increases or decreases based on axially shifting the aperture stop.

13. The method of claim 10, further comprising imposing a reticle at the first focal plane of the optical system.

14. The method of claim 10, further comprising imposing a reticle at the second focal plane of the optical system.

15. The method of claim 10, wherein projecting, with the eyepiece, the image of the second focal plane to infinity projecting light towards an exit pupil.

16. The method of claim 10, wherein axially shifting the aperture along the optical axis toward the collimating lens shortens the distance between the eyepiece and the exit pupil.

17. The method of claim 10, wherein axially shifting the aperture along the optical axis away from collimating lens lengthens the distance between the eyepiece and the exit pupil.

18. The method of claim 10, wherein axially shifting the aperture along the optical axis includes manual or automatic axial shifting.

19. The method of claim 10, wherein the optical system is adapted to function within one or more of the following apparatuses: a telescope, microscope, or medical imaging device.

20. A terrestrial eyepiece with adjustable eye relief comprising:
    a collimating lens configured to create an image of a first focal plane an infinite distance away;
    a focusing lens configured to project the image of the first focal plane from infinity to a second focal plane;
    an eyepiece configured to receive an image of the second focal plane and project the image of the second focal plane to infinity;
    an aperture stop configured to shift axially between the collimating lens and the focusing lens such that an axial shift toward the focusing lens increases a distance between the eyepiece and the exit pupil, and an axial shift toward the collimating lens decreases the distance between the eyepiece and the exit pupil; and a monocular housing defined by the collimating lens and the eyepiece.

\* \* \* \* \*